(12) United States Patent
Werly et al.

(10) Patent No.: US 12,267,392 B2
(45) Date of Patent: Apr. 1, 2025

(54) LOW-CONSUMPTION HUB AND DETECTOR CONFIGURED TO COMMUNICATE WITH THIS HUB

(71) Applicant: ENGIE, Courbevoie (FR)

(72) Inventors: Julien Werly, Ermont (FR); Angelique D'Agostino, Ormesson sur Marne (FR); Fabian Rupin, Paris (FR)

(73) Assignee: ENGIE, Courbevoie (FR)

( * ) Notice: Subject to any disclaimer, the term of this patent is extended or adjusted under 35 U.S.C. 154(b) by 283 days.

(21) Appl. No.: 17/428,034

(22) PCT Filed: Feb. 4, 2020

(86) PCT No.: PCT/FR2020/050182
§ 371 (c)(1),
(2) Date: Aug. 3, 2021

(87) PCT Pub. No.: WO2020/161430
PCT Pub. Date: Aug. 13, 2020

(65) Prior Publication Data
US 2022/0124156 A1    Apr. 21, 2022

(30) Foreign Application Priority Data
Feb. 5, 2019  (FR) ........................ 1901119

(51) Int. Cl.
*H04L 67/12* (2022.01)
*H04Q 9/00* (2006.01)
*H04W 4/38* (2018.01)

(52) U.S. Cl.
CPC ............... *H04L 67/12* (2013.01); *H04Q 9/00* (2013.01); *H04W 4/38* (2018.02)

(58) Field of Classification Search
CPC ........ H04L 67/12; H04W 4/80; H04W 12/06; H04W 52/02; H04W 76/14; H04W 4/38; H04B 5/00; H04B 5/02; A61B 5/05; A61B 5/145; A61B 5/1486; H04Q 9/00
See application file for complete search history.

(56) References Cited

U.S. PATENT DOCUMENTS

| | | | |
|---|---|---|---|
| 10,985,804 B2* | 4/2021 | Miller | H04B 5/0043 |
| 2017/0281000 A1* | 10/2017 | Wedekind | G16H 40/60 |
| 2019/0014291 A1 | 1/2019 | Siminoff | |
| 2019/0020632 A1* | 1/2019 | Leavy | H04L 9/14 |

FOREIGN PATENT DOCUMENTS

| | | | |
|---|---|---|---|
| FR | 2812084 A1 | 1/2002 | |
| WO | WO-2018073785 A1 * | 4/2018 | H04B 1/69 |

OTHER PUBLICATIONS

International Search Report and Written Opinion from PCT Application No. PCT/FR2020/050182, May 8, 2020.
French Search Report from corresponding FR Application No. FR1901119, Dec. 12, 2019.

* cited by examiner

*Primary Examiner* — Justin Y Lee
(74) *Attorney, Agent, or Firm* — Workman Nydegger

(57) ABSTRACT

The hub and this detector are configured to be able to pair and synchronize with one another. This hub and the detector each include a computer program allowing them to compute intervals during which the detector can send to the hub, by a radio communication module, collection data obtained by a sensor and representing the environment of this sensor. The hub only activates its radio communication module during these intervals.

11 Claims, 2 Drawing Sheets

LOW-CONSUMPTION HUB AND DETECTOR CONFIGURED TO COMMUNICATE WITH THIS HUB

TECHNICAL FIELD

The invention relates to the general field of collection or feedback, in a network, of information acquired by sensors and via a hub.

The invention is applicable preferably but without limitation in an environment in which electrical networks are rare or of poor quality or even non-existent. In such an environment, it is natural to seek to use a hub with independent power and low power consumption. It is generally agreed that the consumption of such a hub should be less than 5000 Wh/year and that the volume of its power source should be less than 2 liters, for simple questions of logistics.

In the prior art, hubs receive signals transmitted by the sensors by radio frequency communication means. These communication means are permanently active to be able to receive the signals from the sensors.

Unfortunately, this type of listening consumes a good deal of power. As a rough figure, the average power of these hubs can be considered to be between 1 W and 2 W and their annual consumption is between 8760 Wh and 17520 Wh. Taking into account a safety coefficient of 1.4, the necessary quantity of power to be provided for is between 12,000 Wh and 24,500 Wh per year.

It has been envisioned to supply power to such a hub either with a battery pack or with solar panels (or any other renewable power source) combined with a battery.

Unfortunately, these solutions are burdensome and do not make it possible to meet the desired features (bulk of less than 2 liters, consumption less than 5000 Wh/year).

The invention relates to a hub which does not have these drawbacks and a detector including a sensor capable of feeding back data to such a hub.

SUMMARY OF THE INVENTION

More precisely, and according to a first aspect, the invention relates to a detector including:
- a sensor configured to acquire a feature of the environment of said sensor;
- a module configured to pair the detector with a hub, and to receive, during this pairing, a unique identifier of the detector;
- a memory for storing this unique identifier and a computer program;
- a module for synchronizing a clock of the detector with a clock of the hub;
- a radio communication module controlled by the clock of the detector;
- a computing module configured to determine, on the basis of the unique identifier of the detector, and by executing the computer program, at least one interval of transmission of a collection datum obtained on the basis of the environment feature acquired by the sensor;
- the radio communication module being configured to send the collection datum to the hub during the transmission interval.

According to a second aspect, the invention relates to a hub including:
- a module configured to pair the hub with at least one detector and to send to this detector, during the pairing, a unique identifier specific to the detector;
- a memory for storing this unique identifier and a computer program;
- a module for synchronizing a clock of the hub with a clock of the detector;
- a radio communication module controlled by the clock of the hub;
- a computing module configured to determine, for each of the detectors, on the basis of the unique identifier specific to the detector, and by executing the computer program, at least one interval of reception of a collection datum sent by the detector;
- a controlling module configured to activate the radio communication module in the reception intervals, to receive collection data transmitted by at least one detector and to deactivate the radio communication module, at least as a receiver, outside these intervals; and
- a communication module configured to transfer the collection data to at least one remote equipment item.

Finally, the invention relates to a system including a hub and at least one detector as mentioned previously wherein each transmission interval determined by a detector is equal or contained in a reception interval determined by the hub.

Thus, and in general, the invention makes provision for reducing the listening intervals of the hub for the purpose of decreasing its power consumption, by synchronizing the reception intervals of the hub with the transmission intervals of the detectors.

The invention thus makes it possible to feed back through the network data representative of the environment of the sensor, for example a concentration of dihydrogen in the surrounding fluid, by keeping to a minimum the power of the hub required to make its radio communication means operate.

It is essential that the hub be synchronized with each of the detectors.

In an embodiment, the synchronization module of the hub and the synchronization module of each of the detectors become synchronized independently from one another on a third-party device.

In another embodiment, the radio communication module of at least one detector is configured to receive a synchronization message transmitted by the hub, the clock of the detector being synchronized by the synchronization module of the detector on the basis of this synchronization message.

In this embodiment, the hub is characterized in that its radio communication module is configured to send a synchronization message to at least one detector, so that the latter synchronizes its clock with the clock of the hub.

This synchronization message can be sent to a detector by the hub in response to the reception of collection data sent by this detector. This embodiment makes it possible to maintain good synchronization between the equipment items.

In an embodiment, the radio communication means of the detectors and the hub are configured to communicate in one and the same unique frequency band. In this embodiment, the hub can only listen to a detector at a given time. The transmission and reception intervals determined for one detector do not overlap, even partially, with the transmission and reception intervals determined for another detector.

In another embodiment, the radio communication means of the hub are configured in at least two frequency bands, such that the hub can listen to at least two detectors at the same time if they transmit in two different frequency bands. In this embodiment, at least one transmission interval determined for a first frequency band can overlap with a transmission interval determined for a second frequency band different from the first frequency band. In practice, the radio communication means of the hub can operate over eight frequency bands, each of the detectors being configured to be able to communicate over one of these bands. A hub with more than eight frequency bands can be used in the invention but its electronics are then more complex. In an embodiment, the radio communication modules of the hub and of the detectors are compatible and operate in a LPWAN network, for example using the LoRaWAN protocol standardized by the LoRa Alliance.

For more information about this protocol, those skilled in the art may refer to the document LoRaWAN™ 1.1 Specification.

BRIEF DESCRIPTION OF THE DRAWINGS

Other features and advantages of this invention will become apparent from the description given below, with reference to the appended drawings which illustrate an exemplary embodiment thereof without any limitation. In the figures.

DESCRIPTION OF THE EMBODIMENTS

Figure 1:
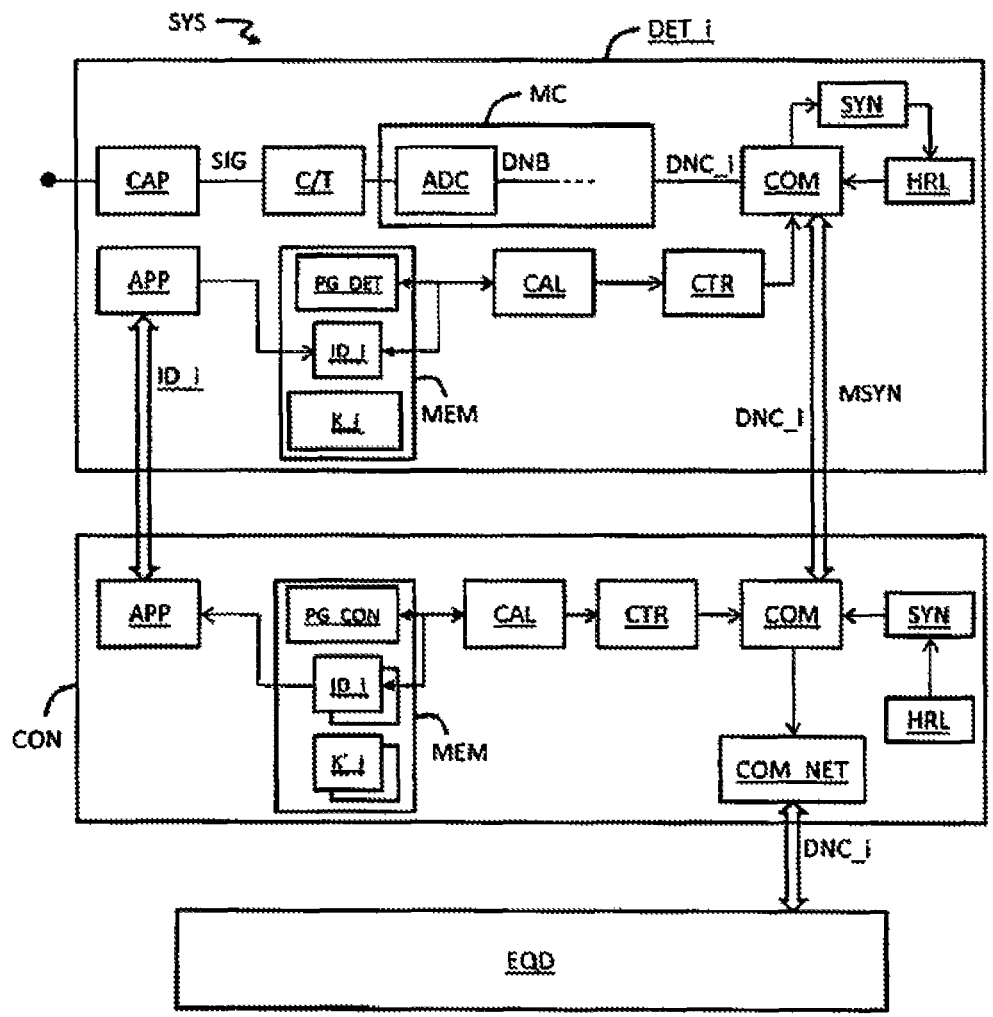
FIG. 1 shows a system in accordance with the invention.

FIG. 1 shows a system SYS in accordance with the invention. This system includes a hub CON in accordance with the invention and a plurality of detectors in accordance with the invention, only a single one of which DET_i is shown. It will be supposed in this example that the system includes M detectors DET_0, . . . DET_M−1

In the embodiment described here, each detector DET_i includes:
- a clock HRL and a synchronization module SYN configured to synchronize this clock on the basis of synchronization messages MSYN received from the hub CON;
- a module APP for pairing the detector DET with the hub CON, this module being configured to receive during this pairing, via a radio frequency transmission, an identifier ID_i of the detector;
- a memory MEM configured to store in the memory the identifier ID_i of the detector, a computer program PG_DET and cryptographic keys K_i specific to the detector and used for the pairing with the hub;
- a sensor CAP configured to generate an electrical signal SIG representing a feature of the environment of the sensor CAP. In the embodiment described here, this feature is a concentration of hydrogen and the signal SIG represents the concentration of hydrogen in the environment of the sensor;
- a current-to-voltage converter C/T configured to convert the signal SIG into a voltage;
- a microcontroller MC including an analog-to-digital converter ADC configured to convert the voltage into an output of the current-to-voltage converter C/T into a raw digital datum DNB and send it to a radio communication module COM controlled by the clock HRL, a digital collection datum DNC_i obtained on the basis of this raw digital datum DNB;
- a computing module CAL configured to determine on the basis of the identifier ID_i of this detector, by executing said computer program PG_DET, at least one transmission interval of the digital collection datum DNC_i;
- a controlling module CTR configured to activate the radio communication module COM in the determined transmission interval or intervals to send the collection data DNC_i to the hub CON and to deactivate this communication module COM, at least as a transmitter, outside these intervals; and
- said radio communication module COM, the latter being configured to send the digital collection datum DNC_i to the hub CON and to receive synchronization messages MSYN from the hub CON.

In the embodiment described here, the digital collection datum DNC_i sent to the hub CON is the raw digital datum DNB obtained by conversion of the signal proportional to the feature of the environment of the sensor.

In the embodiment described here, the hub CON includes:
- a clock HRL and a synchronization module SYN configured to generate synchronization messages MSYN on the basis of this clock HRL
- a module APP for pairing the hub CON with each detector DET_i, this module being configured to send to a detector DET_i, during the pairing with this detector DET_i, via a radio frequency transmission, an identifier ID_i of this detector DET_i;
- a memory MEM configured to store in the memory the identifiers ID_i of all the detectors DET_i, a computer program PG_CON, and cryptographic keys K'_i used for the pairing with the detectors DET_i;
- a radio communication module COM controlled by the clock HRL, compatible with the radio communication module COM of each of the detectors DET_i, and configured to send the synchronization messages MSYN to each of the detectors DET_i;
- a computing module CAL configured to determine, for each detector DET_i, on the basis of the identifier ID_i of this detector, by executing said computer program PG_CON, one reception interval per digital collection datum DNC_i transmitted by the detector DET_i;
- a control module CTR configured to activate the radio communication module COM in said determined intervals to receive the collection data DNC_i transmitted by the detectors DET_i and to deactivate this communication module COM, at least as a receiver, outside these intervals; and
- a communication module COM_NET configured to transfer said collection data DNC_i to at least one remote equipment item EQD.

In an embodiment, the communication module COM_NET can be configured to directly retransmit the collection data DNC_i when they are received by the radio communication module COM.

In another embodiment, the communication module COM_NET can be configured to retransmit the collection data DNC_i in a manner decorrelated from their reception, for example at a determined time, or for example in response to a request of this kind from the remote equipment item EQD.

In the embodiment described here, the radio communication modules COM of the detectors DET_i and of the hub CON are compliant with the LoRaWAN protocol.

Figure 2:
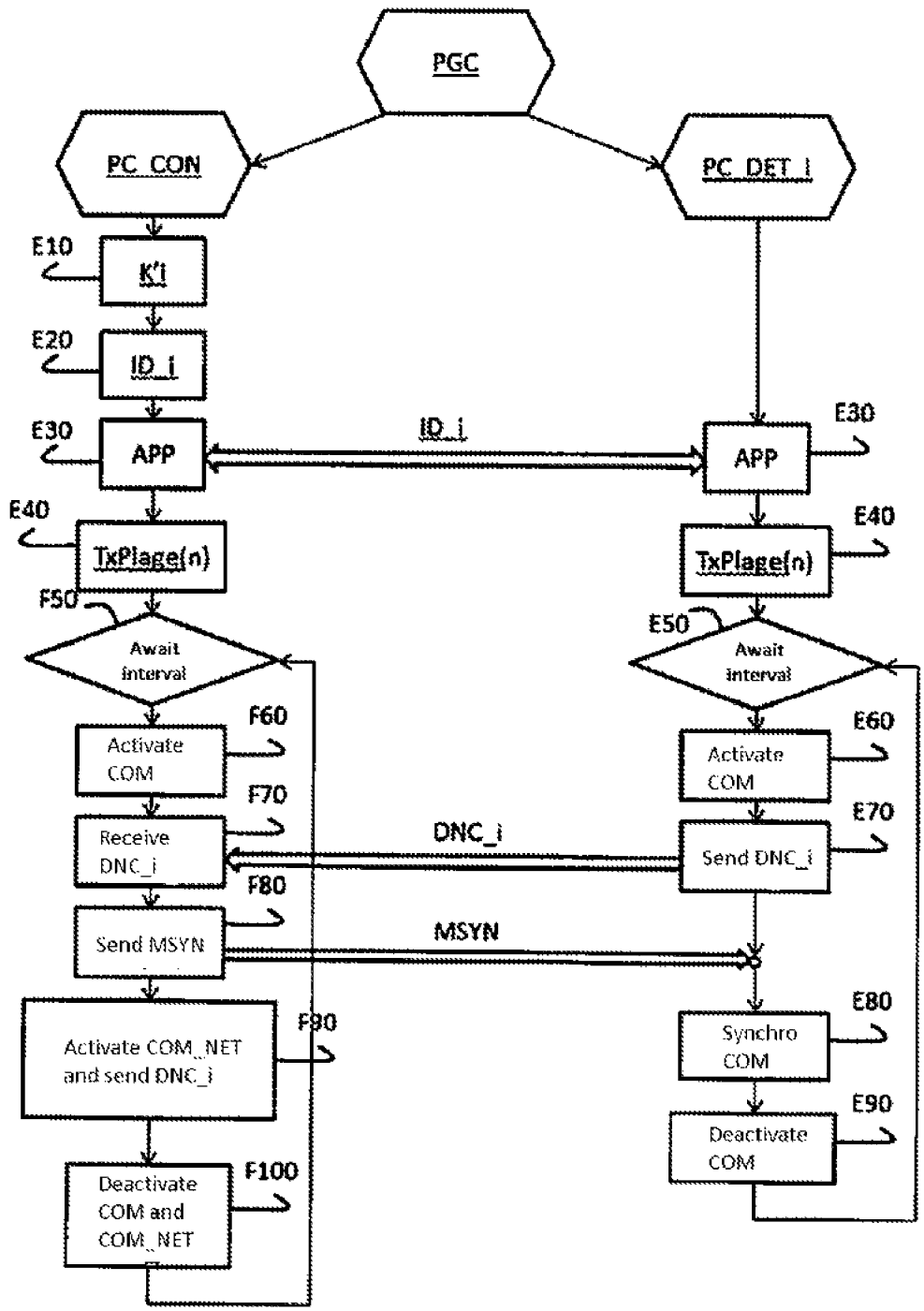
FIG. 2 shows a collection method implemented by a detector and by a hub in accordance with a particular mode of embodiment of the invention.

FIG. 2 represents a general collection method PGC implemented by a detector and by a hub in accordance with a particular embodiment of the invention. This general collection method includes a collection method PC_DET_i implemented by each of the detectors DET_i and a collection method PC_CON implemented by the hub CON.

In the embodiment described here, during a configuration step E10, the operator records, in the memory MEM of the hub, the cryptographic keys K'_i for each of the detectors.

In the embodiment described here, during a step E20, the hub CON associates a unique identifier ID_i with each detector DET_i. It stores these identifiers ID_i in its memory MEM. This step E20 can be carried out as soon as the operator records the cryptographic keys K'_i of a detector DET_i.

In the embodiment described hereinafter, it will be supposed that ID_i=i.

To pair a detector DET_i with the hub CON, this detector DET_i and the hub CON implement a pairing step E30. This step known to those skilled in the art of IoT (Internet of Things) networks referred to as OTAA (Over The Air Activation) uses the cryptographic keys K_i and K'_i. During this step E30, the hub CON transmits, via a radio frequency transmission, the unique identifier ID_i to the detector DET_i. The detector DET_i records its unique identifier ID_i in its memory MEM.

In accordance with the invention, each detector DET_i includes in its memory MEM a computer program PG_DET and the hub CON includes in its memory MEM a computer program PG_CON.

These programs may be identical.

Whatever the case, the program PG_DET implemented by a detector DET_i and the program PG_CON implemented by the hub CON must allow this detector DET_i and the hub CON to compute independently of one another, during a step E40, a time interval.

The time interval computed by the detector DET_i is intended to be used by the detector DET_i to send a digital collection datum DNC_i to the hub CON.

Meanwhile, the hub COM is configured to activate its communication means COM during the time interval it has itself computed to receive the digital collection datum DNC_i transmitted by the detector DET_i.

Consequently, the time interval computed by the detector DET_i must be contained in the time interval computed by the hub CON. In the embodiment described here, these time intervals are identical.

In the embodiment described here, during the step E40, the detector DET_i, of identifier ID_i, on the one hand, and the hub CON on the other, compute the start times, expressed in seconds starting from 0H, of the transmission intervals of the detector DET_i using the following formula:

$$TxPlage(n)=(86\,400/Nb\_Trans)*(N+(ID\_i/NMaxDet)), \text{ wherein:}$$

NMaxDet is the maximum number M of detectors possible in the system;

NB_Trans is the number of transmissions desired per day for the detector Det_i;

n is the transmission number, contained between 0 and NB_Trans−1;

ID_i is the unique identifier of the detector DET_i, contained between 0 and M−1;

Consequently, supposing that:

NMaxDet (maximum number of detectors possible in the system)=4; and

Nb_Trans (number of transmissions desired per day per detector)=3, the table below summarizes the transmission start times of each of the detectors DET_0 to DET_3 of identifier ID_i from 0 to 3;

TABLES 1

| Detector | Id_i | Interval | TxPlage(n) = (86400/3)*(n + (ID_i/4)) |
|---|---|---|---|
| Id_0 | 0 | n = 0 | 0 s = 0 H |
| Id_0 | 0 | n = 1 | 28800 s = 8 H |
| Id_0 | 0 | n = 2 | 57600 = 16 H |
| Id_1 | 1 | n = 0 | 7200 s = 2 H |
| Id_1 | 1 | n = 1 | 36000 = 10 H |
| Id_1 | 1 | n = 2 | 64800 = 18 H |
| Id_2 | 2 | n = 0 | 14400 s = 4 H |
| Id_2 | 2 | n = 1 | 43200 s = 12 H |
| Id_2 | 2 | n = 2 | 72000 s = 20 H |
| Id_3 | 3 | n = 0 | 21600 s = 6 H |
| Id_3 | 3 | n = 1 | 50400 s = 14 H |
| Id_3 | 3 | n = 2 | 79200 s = 22 H |

The intervals have at least a duration of several seconds. In the embodiment described here, the intervals all have the same duration, for example 10 s.

By way of example, the detector DET_2 determines that it can transmit digital collection data DNC in the intervals [4H00-4H05], [12H00-12H05], [20H00-20H05].

Similarly, the hub CON determines that it must:

activate its communication means in the interval [0H00-0H05] to receive a digital collection datum DNC_0 transmitted by the detector DET_0;

activate its communication means in the interval [2H00-2H05] to receive a digital collection datum DNC_1 transmitted by the detector DET_1;

activate its communication means in the interval [4H00-4H05] to receive a digital collection datum DNC_2 transmitted by the detector DET_2;

activate its communication means in the interval [6H00-6H05] to receive a digital collection datum DNC_3 transmitted by the detector DET_3;

activate its communication means in the interval [8H00-8H05] to receive a digital collection datum DNC_0 transmitted by the detector DET_0;

activate its communication means in the interval [10H00-10H05] to receive a digital collection datum DNC_1 transmitted by the detector DET_1;

activate its communication means in the interval [12H00-12H05] to receive a digital collection datum DNC_2 transmitted by the detector DET_2;

activate its communication means in the interval [14H00-14H05] to receive a digital collection datum DNC_3 transmitted by the detector DET_3;

activate its communication means in the interval [16H00-16H05] to receive a digital collection datum DNC_0 transmitted by the detector DET_0;

activate its communication means in the interval [18H00-18H05] to receive a digital collection datum DNC_1 transmitted by the detector DET_1;

activate its communication means in the interval [20H00-20H05] to receive a digital collection datum DNC_2 transmitted by the detector DET_2;

activate its communication means in the interval [22H00-22H05] to receive a digital collection datum DNC_3 transmitted by the detector DET_3; and deactivating its communication means COM outside these time intervals.

In an embodiment of the invention, the maximum number NMaxDet of detectors possible in the system is 150. This number advantageously makes it possible for the hub to listen to a high number of detectors while keeping a relatively small power consumption.

During a step E50 (respectively F50), the detector DET_i (and the hub CON respectively) awaits the beginning of the next interval it has computed in the step E40.

During a step E60 (respectively F60), just before the start of the interval, the detector DET_i (and the hub CON respectively) activates its communication means COM.

The detector DET_i therefore obtains a digital collection datum DNC_i on the basis of the information measured by the sensor in its environment and sends this datum DNC_i to the hub during a step E70. The hub CON receives this datum DNC_i during a step F70.

In the embodiment described here, the hub responds to this message by sending (step F80) a synchronization message to the detector DET_i so that it can resynchronize (or correct the time drift of) its communication means with those of the hub CON (step E80). In practice, the clocks of the detectors DET_i have a low drift between 2 synchronization intervals.

The detector DET_i deactivates its communication means COM (step E90) and awaits the next interval by return to step E50.

During a step F90, the hub CON activates its communication module COM_NET and sends the digital collection datum DNC_i received from the detector DET_i to the remote equipment item EQD.

[53] During a step F100, the hub CON deactivates its communication means COM and COM_NET and awaits the next interval by return to step F50.

The invention claimed is:

1. A detector including:
    a sensor configured to acquire a feature of the environment of said sensor;
    a pairing module configured to pair said detector with a hub, and to receive from said hub, during said pairing, a unique identifier of said detector;
    a memory for storing said unique identifier and a computer program;
    a synchronization module for synchronizing a clock of said detector with a clock of said hub;
    a radio communication module controlled by the clock of the detector;
    a computing module configured to determine, as a function of said unique identifier, and by executing said computer program, a start time of at least one interval of transmission of a collection datum obtained on the basis of the environment feature acquired by the sensor;
    said radio communication module being configured to send said collection datum to said hub during said transmission interval.

2. The detector according to claim 1, wherein said radio communication module of at least one detector is configured to receive a synchronization message transmitted by said hub, said clock of the detector being synchronized by said synchronization module on the basis of said synchronization message.

3. The detector according to claim 2, wherein said radio communication module is configured to receive said synchronization message in response to said sending of the collection datum.

4. The detector according to claim 1 wherein said feature is a measure of a feature in a fluid surrounding said sensor, a concentration of dihydrogen in said fluid.

5. A hub including:
    a pairing module configured to pair said hub with at least one detector and to send to said at least one detector, during said pairing, a unique identifier specific to said detector;
    a memory for storing said unique identifier and a computer program;
    a synchronization module for synchronizing a clock of said hub with a clock of said at least one detector;
    a radio communication module controlled by said clock of the hub;
    a computing module configured to determine, for each of said detectors, as a function of said unique identifier specific to said detector, and by executing said computer program, a start time of at least one interval of reception of a collection datum sent by said detector;
    a controlling module configured to activate said radio communication module in said reception intervals to receive collection data transmitted by said at least one detector and to deactivate said radio communication module, at least as a receiver, outside these intervals; and
    a communication module configured to transfer said collection data to at least one remote equipment item.

6. The hub according to claim 5, wherein said radio communication module is configured to send a synchronization message to at least one detector, so that said at least one detector synchronizes its clock with the clock of said hub.

7. A system comprising:
    at least one detector; and
    a hub;
    wherein the at least one detector includes:
        a sensor configured to acquire a feature of the environment of said sensor;
        a first detector module configured to pair said detector with the hub, and to receive from said hub, during said pairing, a unique identifier of said detector;
        a detector memory for storing said unique identifier and a detector computer program;
        a second detector module for synchronizing a clock of said detector with a clock of said hub;
        a detector radio communication module controlled by the clock of the detector;
        a detector computing module configured to determine, as a function of said unique identifier, and by executing said detector computer program, a start time of at least one interval of transmission of a collection datum obtained on the basis of the environment feature acquired by the sensor;
        said detector radio communication module being configured to send said collection datum to said hub during said transmission interval;
    wherein the hub includes:
        a first hub module configured to pair said hub with the at least one detector and to send to said at least one detector, during said pairing, a unique identifier specific to said detector;
        a hub memory for storing said unique identifier and a hub computer program;
        a second hub module for synchronizing the clock of said hub with the clock of said at least one detector;
        a hub radio communication module controlled by said clock of the hub;
        a hub computing module configured to determine, for each of said detectors, as a function of said unique identifier specific to said detector, and by executing said hub computer program, a start time of at least one interval of reception of a collection datum sent by said detector;
        a controlling module configured to activate said hub radio communication module in said reception intervals to receive collection data transmitted by said at least one detector and to deactivate said hub radio communication module, at least as a receiver, outside these intervals; and a hub communication module configured to transfer said collection data to at least one remote equipment item;

wherein each transmission interval determined by a said detector is contained in one and only one reception interval determined by said hub.

8. The system according to claim 7 wherein each transmission interval determined by a said detector is equal to one and only one reception interval determined by said hub.

9. The system according to claim 7 wherein said radio communication module of said at least one detector and of said hub are configured to communicate in one and the same unique frequency band, the transmission and reception intervals determined for one and the same detector not overlapping, even partially, with the transmission and reception intervals determined for another detector.

10. The system according to claim 7 wherein said radio communication module of said at least one detector and of said hub are configured to communicate in at least two frequency bands, and wherein at least one transmission interval determined for a first frequency band overlaps with a transmission interval determined for a second frequency band different from the first frequency band.

11. The system according to claim 7 wherein said radio communication modules of the hub and of said at least one detector are compatible and operate in a LPWAN network, using the LoRaWAN protocol.

* * * * *